United States Patent [19]

King

[11] Patent Number: 5,439,192
[45] Date of Patent: Aug. 8, 1995

[54] HAND-WORN DEVICE FOR ELEVATING THE HAND AND FINGERS WITH RESPECT TO A KEYBOARD

[76] Inventor: Mariam C. King, 7204 Pinebark Ct., Raleigh, N.C. 27615

[21] Appl. No.: 243,126

[22] Filed: May 16, 1994

[51] Int. Cl.⁶ ............................................. B43L 15/00
[52] U.S. Cl. ................................. 248/118; 248/118.5
[58] Field of Search ............... 248/118, 118.1, 118.3, 248/118.5, 918; 482/49, 105

[56] References Cited

U.S. PATENT DOCUMENTS

| | | | |
|---|---|---|---|
| 33,638 | 11/1861 | Eastman | 248/118.5 |
| 217,499 | 7/1879 | Wells | 248/118.5 X |
| 3,496,573 | 2/1970 | Kuchar et al. | 482/49 X |
| 4,711,445 | 12/1987 | Whitehead | 482/49 |
| 5,075,902 | 12/1991 | McReynolds et al. | 482/105 X |
| 5,169,371 | 12/1992 | Holmes | 482/105 |
| 5,193,771 | 3/1993 | Hassel et al. | 248/118 |
| 5,335,888 | 8/1994 | Thomsen | 248/118.1 X |

FOREIGN PATENT DOCUMENTS 57540  1/1891  Germany ........................ 248/118.5

*Primary Examiner*—Karen J. Chotkowski
*Attorney, Agent, or Firm*—Rhodes, Coats & Bennett

[57] ABSTRACT

The present invention entails a hand-worn device for encircling the base portion of a person's hand and for elevating that hand and the associated fingers with respect to a keyboard. Forming a part of the device, is a pliable and elastic cuff that encircles the base of the hand and which includes a thumb opening through which the thumb of the hand projects. The cuff specifically encircles and wraps around the lower base of the hand and particularly wraps around and covers the heel of the hand. An attachable elevating pad that is relatively small is provided. The attachable elevating pad is designed to attach directly to the cuff in the area adjacent the heel of the hand.

10 Claims, 3 Drawing Sheets

HAND-WORN DEVICE FOR ELEVATING THE HAND AND FINGERS WITH RESPECT TO A KEYBOARD

FIELD OF INVENTION

The present invention relates to body worn devices that are worn by a person that operates a keyboard wherein the device is designed to elevate a person's hand and the fingers associated with the hand with respect to the keyboard.

BACKGROUND OF THE INVENTION

Many people that work at a keyboard experience fatigue, stress and pain in the fingers, arms, shoulders, and hand. Often these symptoms reflect what has become know as carpal tunnel syndrome. The real problem here lies in the orientation of the hands and fingers with respect to the keyboard. It is not uncommon for a typist or keyboard operator to rest the base of his or her hand on a flat support that extends out from the keyboard. This means that the operator has to hold and support his or her fingers at an upright angle while manipulating the keyboard. This leads to stress and fatigue in the fingers, finger joints and hand. In most cases, it is desirable for the fingers to assume a generally horizontal position while manipulating the keyboard. It is widely appreciated that by correctly positioning the hands and fingers with respect to the keyboard such that the fingers extend generally level or horizontal that such has the tendency of minimizing stress and fatigue in the fingers, finger joints and in the hand.

This problem has been appreciated in the past. For example, U.S. Pat. No. 4,973,176 shows a support pad that rests underneath the base of the palm of the hand for elevating the base of the hand with respect to the keyboard. In this patent, the author discusses that such elevation of the hand will minimize fatigue and muscle pain in the hands, wrist, arms, shoulder and back. Also, in this same regard, one is referred to the disclosure found in U.S. Pat. No. 5,193,771. As shown in FIG. 1 of this patent, the support device disclosed therein includes a neck that extends forwardly underneath the palm of the typist's hands. This has a tendency to elevate the hand and fingers and to accordingly relieve stress and fatigue in the hand and fingers.

The principal drawback to the devices discussed above and shown in the above two patents and other related prior art devices, is that the designs offered to solve the problem tend to be very awkward and cumbersome to use. Beyond that, many such hand elevating devices of the prior art tend to encumber and restrain the attached hand and fingers. In the end, many of the prior art devices by being bulky, awkward and restrictive cause more problems than they solve.

It is therefore an object of the present invention to provide a hand elevating device that overcomes many of the shortcomings of prior art devices and which can be easily and comfortably worn.

SUMMARY AND OBJECTS OF THE INVENTION

The present invention entails a body worn device that is particularly designed to be worn about the base of the hand so as to elevate that hand and the associated fingers with respect to an adjacent keyboard. In particular, the device of the present invention includes a cuff that extends around the base of the hand and there is provided a separate elevating pad that is attachable and detachable with respect to the cuff. The separate elevating pad is designed to attach directly to the heel portion of the hand, just below the palm, such that when the hand is rested on a support structure adjacent the keyboard, the elevating pad will cause the hand to be raised to a point where the fingers will extend generally horizontal or level with respect to the keyboard.

It is therefore an object of the present invention to provide a body worn device that is adapted to be worn about the base of a person's hand and designed to elevate the hand and fingers with respect to a keyboard wherein the device as worn is comfortable and non-obtrusive.

Another object of the present invention is to provide a hand elevating device that is compact and which is particularly suitable for continuous wear.

Another object of the present invention resides in a hand elevating device of the character referred to above that is of a two component construction including an elastic and pliable sleeve or cuff that fits around the base of the hand and a detachably mounted elevating pad that can easily and conveniently be attached and detached with respect to the encircling cuff.

Still a further object of the present invention resides in the provision of a hand-worn elevating device that is compact and lightweight.

Other objects and advantages of the present invention will become apparent and obvious from a study of the following description and the accompanying drawings which are merely illustrative of such invention.

DETAILED DESCRIPTION OF THE INVENTION

Figure 1:
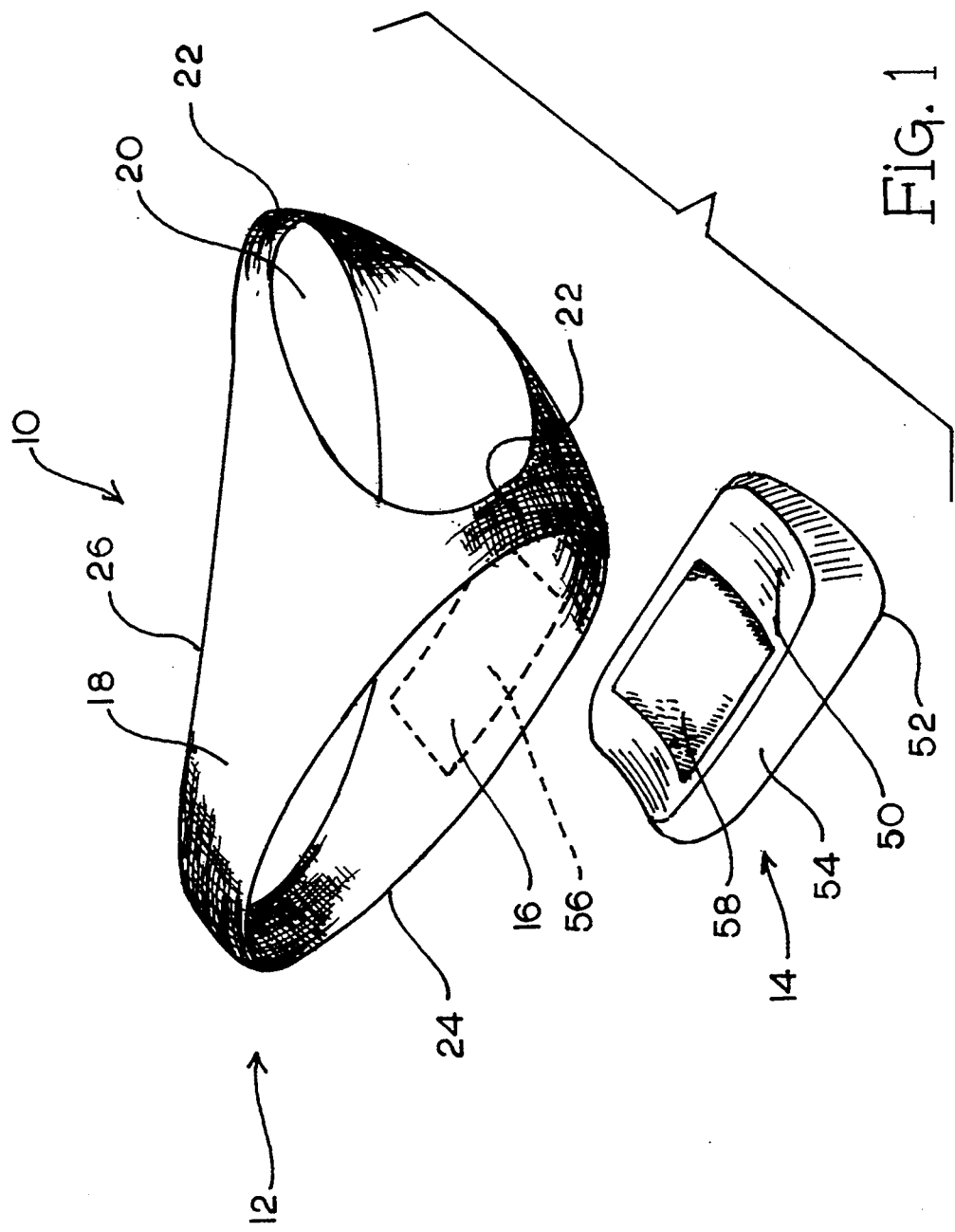
FIG. 1 is a perspective view of the hand-worn hand elevating device of the present invention showing the two basic components thereof, the cuff and the attachable elevating pad.

With further reference to the drawings, the hand elevating device of the present invention is shown therein and indicated generally by the numeral 10. Basically, the hand elevating device 10 of the present invention comprises two basic components, a cuff indicated generally by the numeral 12 and a detachable elevating pad indicated generally by the numeral 14. As will be appreciated from subsequent portions of this disclosure, the detachable elevating pad 14 can be easily and conveniently attached and detached with respect to the cuff 12.

Viewing cuff 12 in more detail, as seen in FIG. 1, the same is adapted to be worn about the base of the hand. There would be provided a right hand cuff as well as a left hand cuff. In any event, the cuff 12 comprises a pliable and elastic material, such as a fabric, which fits around the base of the hand and particularly extends around the back side and the heel of the hand. Between the back side of the hand and the heel of the hand, the cuff splits and forms a thumb opening indicated by the numeral 20 in the drawings.

Viewing the structure of the cuff 12, it is seen that the same includes a heel panel section 16 that basically extends across and covers the heel portion of the hand.

Figure 3:
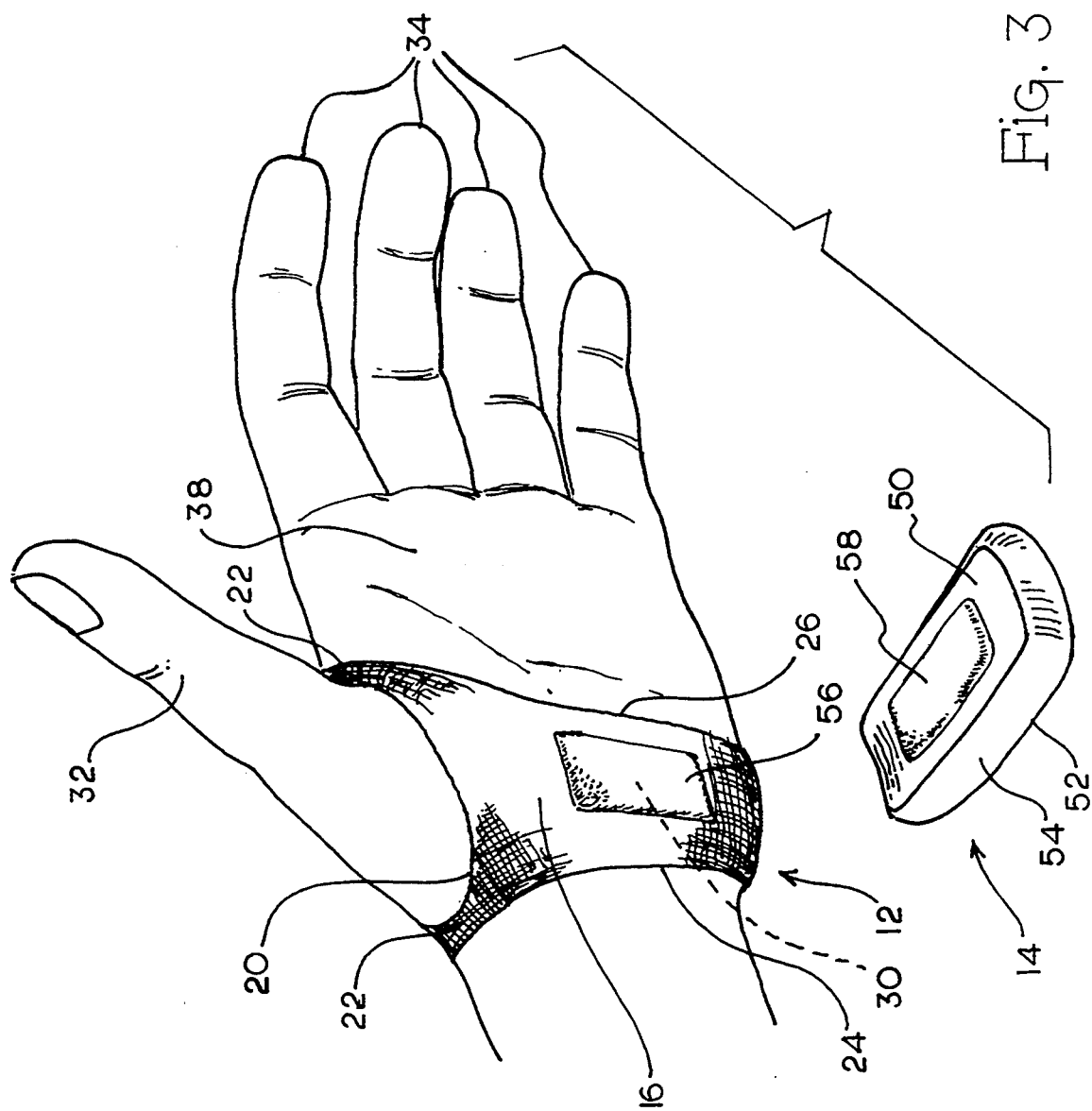
FIG. 3 is a perspective view of the hand elevating device of the present invention shown being worn by the user.

The heel portion of the hand is shown in FIG. 3 and referred to by the numeral 30. The heel portion of the hand lies just below the palm of the hand and is basically convex shaped. Typically, the heel portion of the hand 30 slopes downwardly towards the palm and extends transversely across the base of the hand just below the palm.

Also forming a part of the cuff 12 is a back hand panel section 18 that extends across the back side of the hand opposite the heel panel section 16. On the thumb side of the cuff, there is provided a pair of connecting strips 22 that effectively diverge from both the back hand panel section 18 and heel panel section 16 to form the thumb opening 20. As seen in the drawings, these connecting strips 22 essentially extend around the thumb 32 of the person and effectively connect panel sections 16 and 18 together.

As seen in the drawings, particularly FIG. 1, the cuff 12 defines a hand opening 24 about the base thereof. Basically, the hand opening 24 forms the lower or base terminal portion of the cuff 12. Opposite the hand opening 24 is a forefinger opening 26 through which the forefingers 34 of the person wearing the device of the present invention extend.

Note that in order to fit the cuff 12 about the base of a person's hand, that the entire hand is first extended through the hand opening 24 and thereafter the thumb 32 of the person is extended through the thumb opening 20 while the forefingers 34 of the person are extended through the forefinger opening 26 formed in the cuff. It is also appreciated that the cuff 12 can be made of various types of materials and fabric. However, it is contemplated and desirable that the cuff fit securely around the base of the hand but yet not to be too tight as to be unduly restrictive. Accordingly, it is contemplated that in a preferred embodiment cuff 12 would comprise an elastic and pliable material.

Now, turning to the detachable elevating pad 14, it is seen that the same includes a concave shaped top 14, a bottom 50, and a surrounding side wall 54. Surrounding side wall 54 includes a series of corners, however in the case of the preferred embodiments disclosed herein the corners are essentially rounded off. Top 50, as pointed out above, is concave shaped so as to generally conform to the convex shape of the heel portion 30 of the hand. Note that the elevating pad is relatively small with respect to the entire hand. It is contemplated that in a preferred embodiment the attachable elevating pad 14 would be relatively small and encompass essentially the same area as the area of the heel of the hand. Preferably, when attached the forward most portion of the elevating pad 14 should not extend substantially into the palm area and the lower or base portion of the elevating pad is designed to terminate along the base of the heel and is designed not to extend past the wrist into the forearm area.

Figure 2:
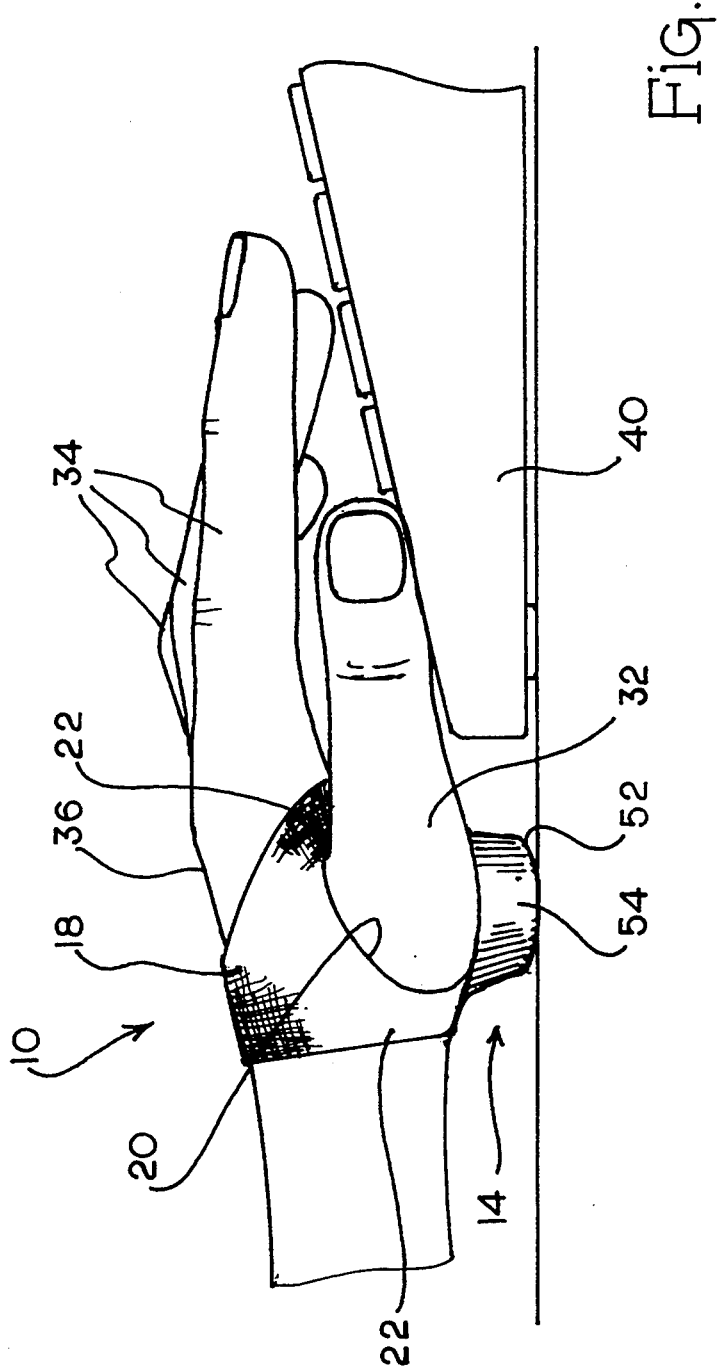
FIG. 2 is a side elevational view of the hand elevating device shown worn about the hand of a user.

Elevating pad 14 can be formed of a dense relatively firm material such as a rubber type product. It is important that the elevating pad 14 be sufficiently firm so as to actually elevate the hand despite downward pressure being applied because it is important that the hand be elevated adjacent the keyboard 40 as indicated in FIG. 2.

As shown in the drawings, the hand elevating device 10 of the present invention is designed such that the elevating pad 14 can be detachably secured to the heel panel section 16 of the cuff 12. In that regard, there is provided a hook and loop type (Velcro ®) fastener 56 on the outside of the heel panel section 16. Correspondingly, there is provided a mating hook and loop type fastener 58 secured to the top concave surface 50 of the elevating pad 12. Consequently, the total pad 14 can be attached and detached with respect to the cuff 12.

It is appreciated that the elevating pad 14 can be made in various sizes and various heights to accommodate special or particular needs. But from the foregoing specification and discussion, it is appreciated that the present invention presents a compact and lightweight hand elevating device that can be worn about the base of a person's hand and is effective to raise the hand with respect to an adjacent keyboard so as to reduce fatigue and stress within the fingers, hand, arms and shoulders. It is also appreciated that the cuff 12 would be constructed with both left and right hand versions.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended Claims are intended to be embraced therein.

What is claimed is:

1. A two-piece hand work support assembly for elevating the hand of a typist or keyboard operator and elevating the fingers of the hand to where the fingers approximately align with a keyboard, comprising:
   a) a hand-worn cuff that completely encircles the hand including the heel of the hand, a back hand area opposite the heel, and the thumb;
   b) the cuff forming a single hand garment that wraps around the base of the hand and which includes a heel panel and an opposite back hand panel and wherein the wrap-around cuff includes a side thumb opening that is defined by splitting connecting strips that split and extend around the thumb and connect the heel and back hand panels;
   c) a rear hand opening formed on the back side of the cuff and which forms a base terminal end of the cuff;
   d) a forefinfger opening formed on the front side of the cuff when worn and which forms a front terminal end of the cuff and which extends between the thumb and an adjacent forefinger and which is designed to allow the forefingers to extend therethrough as the cuff is inserted over the hand of the subject;
   e) a fastener formed on the outside of the heel panel of the cuff; f) a separate elevating pad detachably securable to the cuff, the elevating pad including a concave interface side that lies directly adjacent the heel panel of the cuff and extends transversely across the heel panel of the cuff when the elevating pad is secured to the cuff and wherein the shape of the concave interface side of the elevating pad assumes a shape that generally approximates the shape of the heel of the hand; and
   g) a mating fastener secured on the concave interface side of the elevating pad fop mating with the fastener formed on the outside of the heel panel that enables the separate elevating pad to be quickly attached and detached with respect to the heel panel of the cuff and enables the cuff to be worn about the hand while the elevating pad has been removed from the cuff.

2. The two-piece hand worn support assembly of claim 1 wherein the separate elevating pad is relatively small compared to the size of the subject's hand and covers an area approximately equal to the area of the heel of the hand.

3. The invention of claim 1 wherein the cuff is constructed of an elastic and pliable material that generally conforms to the shape of that portion of the hand that the same encircles.

4. The invention of claim 1 wherein the separate elevating pad includes a bottom and a surrounding side wall and wherein the surrounding side wall includes a series of corner portions that are rounded, and wherein the separate elevating pad is constructed of a relatively firm material and which withstands substantial compressibility.

5. The invention of claim 1 wherein the cuff is relatively narrow opposite the formed thumb opening but wherein the back hand and heel panels flare outwardly and becomes progressively wider as the back hand and heel panels approach the thumb opening.

6. A hand band worn around the base of a person's hand for elevating the hand and fingers with respect to a keyboard comprising:
   a) an elastic and pliable cuff that encircles a base portion of a person's hand and which includes a heel panel that particularly around the heel of the hand;
   b) a detachable and separable elevating pad for fitting directly adjacent the heel panel of the cuff and the heel of the hand for elevating the heel of the hand with respect to an adjacent keyboard;
   c) the elevating pad having a generally concave top side that extends transversely across the heel panel of the cuff and fits directly adjacent the cuff and the heel of the hand so as to elevate the heel of the hand; and
   d) wherein the top concave side of the elevating pad is designed to be secured directly to that portion of the cuff that extends over and around the heel of the hand and wherein the elevating pad may be removed from the heel panel of the cuff such that the cuff may be worn about the person's hand while the elevating pad is removed.

7. The device of claim 6 wherein there is provided a hook and loop type fastener formed on the outside of the heel panel; and wherein the elevating pad includes a hook and loop mating fastener formed on the top concave side thereof for mating and connecting with the hook and loop fastener formed on the outside of the heel panel.

8. The device of claim 7 wherein the cuff includes a thumb opening defined on one side thereof and wherein the cuff extends around the thumb when worn.

9. The device of claim 8 wherein the separable elevating pad is of a size that generally corresponds to the area of the heel of the subject's hand such that when attached to the cuff the elevating pad is spaced downwardly from the palm of the hand and terminates about the lower edge of the heel of the hand.

10. A method of raising and elevating the base of a person's hand and the fingers of the hand so as to better align the fingers of the hand with a keyboard comprising the steps of:
   a) encircling the base of a person's hand with an elastic and pliable cuff and extending the thumb of the hand through the cuff so as to divide the cuff in the area of the thumb;
   b) the step of encircling the base of the hand including extending a heel panel around and over the heel portion of the hand and extending a back hand panel across a back hand area of the hand opposite the heel of the hand;
   c) elevating the heel of the hand by attaching a separable elevating pad to the heel panel of the cuff such that once the elevating pad has been without the elevating pad being attached;
   d) conforming a top side of the elevating pad to the general shape of the heel of the hand and attaching the top side of the elevated pad to the heel panel of the cuff such that the top side of the elevating pad is generally concave shaped and wherein the concave shaped top side of the elevating pad extends transversely across the heel panel when the elevating pad is attached to the cuff; and
   e) maintaining the effective area of the elevating pad to an area that is approximately the size of the heel of the hand by providing an elevating pad that includes a surrounding side wall that defines an effective area that approximates the heel area of the hand and which results in the elevating pad terminating below the central portion of the subject's palm as well as terminating closely adjacent the lower portion of the heel of the hand.

* * * * *